United States Patent [19]

Katayama et al.

[11] E Re. 30,924

[45] Reissued May 11, 1982

[54] CLEANING APPARATUS FOR ELECTROPHOTOGRAPHY

[75] Inventors: Hajime Katayama; Syusei Tsukada, both of Tokyo; Tadayuki Kitajima, Yokohama; Tsukasa Kuge, Kawasaki, all of Japan

[73] Assignee: Canon Kabushiki Kaisha, Tokyo, Japan

[21] Appl. No.: 86,439

[22] Filed: Oct. 19, 1979

Related U.S. Patent Documents

Reissue of:

[64] Patent No.: 3,859,691
Issued: Jan. 14, 1975
Appl. No.: 361,164
Filed: May 17, 1973

U.S. Applications:

[63] Continuation of Ser. No. 693,893, Jun. 8, 1976, abandoned, which is a Reissue of Ser. No. 361,164, May 17, 1973, Pat. No. 3,859,691, which is a continuation of Ser. No. 120,256, Mar. 2, 1971, abandoned.

[30] Foreign Application Priority Data

| | | | |
|---|---|---|---|
| Mar. 10, 1970 | [JP] | Japan | 45-20285 |
| Mar. 17, 1970 | [JP] | Japan | 45-25511 |
| Mar. 17, 1970 | [JP] | Japan | 45-25512 |
| Nov. 24, 1970 | [JP] | Japan | 45-103504 |

[51] Int. Cl.[3] ..... G03G 13/16

[52] U.S. Cl. ..... 15/256.51

[58] Field of Search ..... 15/256.5, 256.51, 256.52, 15/1.5, 4, 100; 118/637; 355/15; 101/169, 425

[56] References Cited

U.S. PATENT DOCUMENTS

| | | | |
|---|---|---|---|
| 1,727,843 | 9/1929 | Tilley | 15/256.51 |
| 3,552,850 | 1/1971 | Royka et al. | 355/15 |
| 3,601,051 | 8/1971 | Gegenheimer | 101/425 |
| 3,656,200 | 4/1972 | Riley, Jr. | 15/256.52 |
| 3,660,863 | 5/1972 | Gerbasi | 15/256.51 |

*Primary Examiner*—Chris K. Moore

*Attorney, Agent, or Firm*—Fitzpatrick, Cella, Harper & Scinto

[57] ABSTRACT

A cleaning apparatus for an electrophotographic apparatus comprising an elastic cleaning blade with a holder arranged along a surface of a photosensitive member for cleaning the toners which still remain on the surface of a photosensitive member even after transferring of developed images to a copying paper is finished. The elastic cleaning blade preferably contacts with the surface of the photosensitive member in such a way that the axis of the blade and a tangent to said surface at the pre-cleaning side subtends an obtuse angle specified in relation with the axis line of the blade in the holder. The holder disposes the elastic cleaning blade relative to the photosensitive member to engage a substantially upwardly moving surface portion of the photosensitive member.

27 Claims, 13 Drawing Figures

CLEANING APPARATUS FOR ELECTROPHOTOGRAPHY

Matter enclosed in heavy brackets [ ] appears in the original patent but forms no part of this reissue specification; matter printed in italics indicates the additions made by reissue.

This is a *continuation, of application Ser. No. 693,893, filed June 8, 1976, and now abandoned, which is a Reissue of Ser. No. 361,164, filed May 17, 1973, now U.S. Pat. No. 3,859,691, issued January 14, 1975, which is a* continuation, of application Ser. No. 120,256, filed Mar. 2, 1971 and now abandoned.

BACKGROUND OF THE INVENTION

1. Field of the Invention

This invention relates to a cleaning apparatus for electrophotography and, more particularly, to a cleaning apparatus for removing toners remaining on a photosensitive member after transferring the images in an electrophotographic reproduction device of image-transferring type.

2. Description of the Prior Art

Representative conventional cleaning apparatuses are a web cleaning apparatus and a fur brush cleaning apparatus. With respect to the web cleaning apparatus, the material of web is limited and the running cost is expensive, and further, cleaning ability varies depending upon the humid state of the web. In addition, the web should be frequently exchanged, and when reproduction of high density is continuously carried out for a long time, the cleaning can not be satisfactorily effected. Referring to the fur brush cleaning apparatus, the apparatus is usually of a large scale since the fur brush should be rotated at high speed, and the life of fur brush is disadvantageously short. In addition, an apparatus for removing the scattered developer by suction is necessary. Further, when reproduction of high density is continued for a long time, the cleaning capacity is not sufficient.

SUMMARY OF THE INVENTION

According to the present invention, the cleaning apparatus for an electrophotographic apparatus of a developed image transferring type comprises an elastic cleaning blade arranged along a surface of a photosensitive member after transferring images and the elastic cleaning blade is supported by a holder. The holder disposes the elastic cleaning blade relative to the photosensitive member to engage a substantially upwardly moving surface portion of the photosensitive member. The elastic cleaning blade preferably contacts with the surface of the photosensitive member to be cleaned in such a way that an angle $\theta_1$, at the pre-cleaning side, subtended by an axis of the portion of the blade contacting the photosensitive member and a tangent line to the surface of the photosensitive member at the contact point and an angle $\phi_1$, at the pre-cleaning side, subtended by an axis of the portion of the blade supported by the holder and the above-mentioned tangent line satisfy the following relation:

$$\theta_1 > \phi_1 > \pi/2$$

The relation will be more fully understood by referring to FIG. 10.

An object of this invention is to provide a novel cleaning apparatus solving the drawbacks of the above-mentioned prior arts.

DESCRIPTION OF THE PREFERRED EMBODIMENTS

Figure 1:
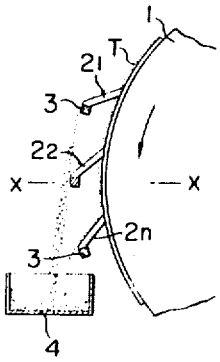
FIG. 1, FIG. 2 and FIG. 3 show embodiments of cleaning apparatus for electrophotography according to this invention where a plurality of elastic blades are used as the cleaning member.

Referring to FIG. 1, a drum photosensitive member 1 is cleaned by blades $2_1$–$2_n$ fixed to holders 3. Blades $2_1$–$2_n$ are made of elastic material such as elastic synthetic resins and rubbers. Toners scratched off from the photosensitive member 1 by blades are collected to a toner receiver 4. In FIG. 1, some of plural blades $2_1$–$2_n$ are arranged under the axis line X—X of the photosensitive member 1 and the photosensitive member 1 is rotated counterclockwise and toner T remaining on the photosensitive member is scratched off by the first blade $2_1$ and falls down to a toner receiver 4 over the surface of the blade $2_1$ through the other end of the blade $2_1$. On the other hand, the remaining toner T not removed by the first blade $2_1$ is removed by the second blade $2_2$ and in a similar way the cleaning is repeated subsequently.

Figure 2:
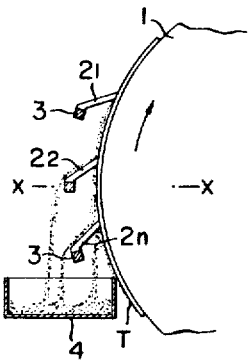

Referring to FIG. 2, the photosensitive member 1 is rotated clockwise and the remaining Toner 2 is scratched off by a blade $2_n$ at the nth step and the toner thus scratched off falls down directly to the toner receiver 4 and therefore, the toner receiver 4 should be placed nearer to the photosensitive member 1 than FIG. 1. In general, a remaining toner not removed by a blade $2_n$ at nth step is removed by a blade $2_{n-1}$ at (n–1)th step (in FIG. 2, corresponding to the second step) and the toner thus removed once falls down to blade $2_n$ at the nth step and then to the toner receiver 4. In a similar way, the cleaning is repeated.

Figure 3:
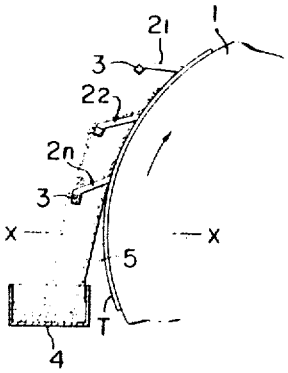

Referring to FIG. 3, all blades $2_1$–$2_n$ are arranged above the axis line X—X and in a way similar to FIG. 2 the cleaning of the photosensitive member 1 is carried out, but a sheet 5 is necessary for introducing toner scratched off by the nth blade $2_n$ to a toner receiver 4. In this case, the sheet 5 contacts lightly with the photosensitive member 1, but does not scratch off the remaining toner on the photosensitive member. The sheet 5 prevents the toner scratched off by a blade $2_n$ from falling down outside of the cleaning box.

Figure 4:
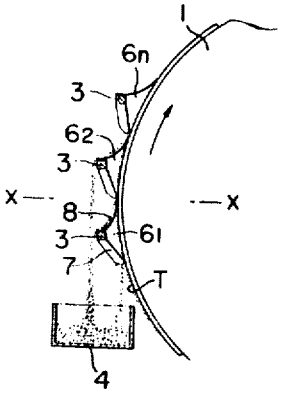
FIG. 4 and FIG. 5 show other embodiments of the blade according to this invention.

Referring to FIG. 4, there is shown an embodiment where another shape of blade is employed, that is, plural blades $6_1$–$6_n$ have toner scratching portion 7 and toner receiving surface 8 and are fixed to a holder 3. Some blades are placed under the axis line X—X of the photosensitive member 1. When the photosensitive member 1 rotates clockwise, the remaining toner T is scratched off by a blade 6, with its scratching portion 7 and the toner thus [scratch] *scratched* off directly falls down to a toner receiver 4. On the other hand, the remaining toner which is not removed by the scratching portion 7 of blade $6_1$ is removed by a scratching portion 7 of a blade $6_2$ and the toner thus removed is introduced into a toner receiver 4 by way of a toner receiving surface 8 of a blade $6_1$. The cleaning of the photosensitive member 1 is subsequently repeated in a way as mentioned above.

Figure 5:
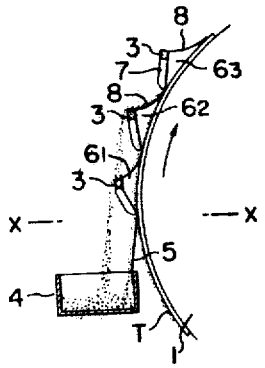

Referring to FIG. 5, all blades are arranged above the axis line X—X of the photosensitive member 1 and the cleaning of the photosensitive member 1 is effected in a way similar to FIG. 4, but toner scratched off by the scratching portion 7 of a blade $6_1$ is introduced to a toner receiver 4 using a sheet 5. In this case, the sheet 5 is arranged in a way similar to FIG. 3 and serves similarly.

In the above embodiments a plurality of blades for scratching off toner are arranged along the surface of the drum photosensitive member 1 after the transferring, and therefore, the cleaning of the photosensitive member 1 can be repeated at each blade to clean completely the photosensitive member. Since each blade [is] *does* not [necessary to] *necessarily* have such a strong contacting pressure against the photosensitive member 1 as compared with a case where only one blade is used for cleaning [and thereby] the surface of photosensitive member 1 is not damaged. Each blade is so arranged that toner scratched off from the surface of photosensitive member 1 can be introduced into a toner receiver 4 by way of each blade and therefore, any particular sheet for guiding the toner is not necessary. Thus, the cleaning apparatus can be of a small type and inexpensive.

When [an] electroconductive blades are used and a bias voltage is applied thereto so as to [absorbing] *absorb* and [removing] *remove* the remaining toner T, the cleaning of photosensitive member 1 can be conducted more completely.

Figure 6:
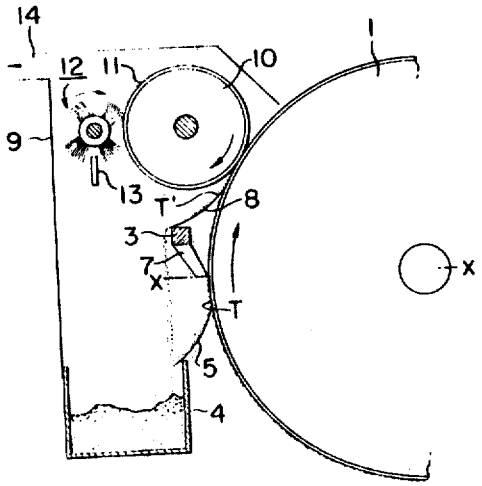
FIG. 6 and FIG. 7 show embodiments of this invention where an elastic cleaning blade and a cleaning roller are employed.
Figure 7:
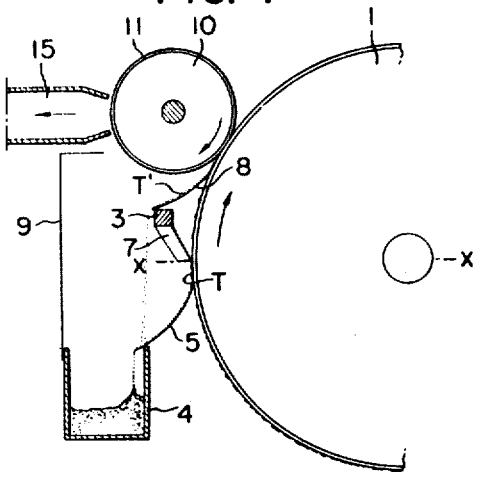

Referring to FIG. 6 and FIG. 7, further embodiments according to this invention are illustrated. [Blades] *A blade* 7 having [holders] *holder* 3 similar to FIG. 4 and FIG. 5 [are] *is* fixed to a cleaning box 9 with holders. The cleaning blade may be made of synthetic resin such as Teflon (Trade name, supplied by E. I. duPont de Nemours & Co. Inc.), silicon rubber, polyester, and polyethylene, or rubbers. The surface of an elastic roller 10 is coated with a cleaning coating 11, e.g., cloth, suede, and jersey and the hardness of the coating is preferably about 20°. A thin synthetic resin (such as polyester) sheet 5 is provided to guide the toner scratched off from the surface of photosensitive member 1 to a toner receiver 4 provided removably at the bottom of the cleaning box 9.

When the photosensitive member 1 rotates to a direction as shown by the arrow, most of toner T remaining on the surface of the photosensitive member 1 [are] *is* scratched off by a blade 7 and then falls down to a toner receiver 4 by way of a sheet 5 and further the toner T' not removed by blade 7 is removed by rubbing with an elastic roller 10 and falls down to a toner receiver 4 by way of a toner receiving surface 8 and thereby the photosensitive member 1 is completely cleaned.

In FIG. 6, a cleaning brush 12 rotating to a direction as shown by the arrow removes the toner on the cleaning coating 11 and the toner attached to the brush is removed by a bar 13. Scattered toners are taken out through a duct 14. In FIG. 7, the toner on the cleaning coating 11 is removed by a vacuum duct 15.

According to the above-mentioned embodiments, both a blade and an elastic roller which are different from each other in point of function are used and this combination can compensate each drawback to result in a complete cleaning. When a blade alone is employed, some portions of the photosensitive member are not completely cleaned, but a part of toner still remains on the photosensitive member in a form of streak since a completely uniform contact between the blade and the longitudinal line on the surface of a drum photosensitive member is not easily obtained. On the contrary, when an elastic roller alone is used, the insufficient cleaning appears as a whole surface smudge.

In the above embodiments, these two cleaning means are combined to scratch off about 90 percent or more of the remaining toner by the blade and clean the still remaining toner in a form of streak by the elastic roller uniformly contacting with the photosensitive member in a longitudinal direction. Since the toner in a form of streak is so little that the load to the roller is not heavy and neither the whole roller becomes dirty. Therefore, the cleaning roller is used only for finishing and further the contacting force to the photosensitive member may be weak. And, therefore, the photosensitive member is not damaged.

In addition, blades and sheets are inexpensive and simple and the exchange thereof is easy.

It is very convenient that a part of the cleaning cloth around the roller is adhered by an adhesive for facilitating the exchange of the cleaning cloth.

Figure 8:
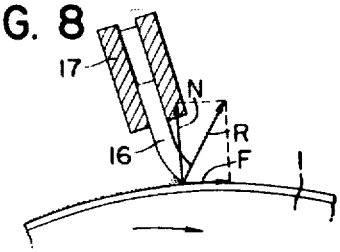
FIG. 8 is a conventional cleaning blade.

Referring to FIG. 8, there [have] *has* been used an elastic blade 16 contacting slantingly with the photosensitive member 1 in conventional devices and the cleaning has been carried out at the acute angle side of angles made between the photosensitive member 1 and the blades. This structure is far better than a cleaning device utilizing a fur web, but the resultant force R of a vertical reaction force N which the blade 16 receives from the photosensitve member 1 and a friction force F between the photosensitive member 1 and the blade 16 is in a direction for leaving the blade 16 from the photosensitive member 1. Therefore, a force obstructing the toner is so weak that toner particles often [enters] *enter* under the blade 16 and further when one particle enters under the blade, the entering of toner particles easily propagates itself over the whole length of the blade. As the result, the blade should be often dismantled to clean the top edge portion of the blade.

Figure 9:
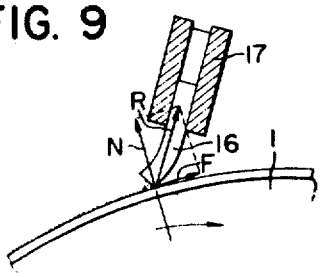
FIG. 9 and FIG. 10 show embodiments of this invention and are diagrammatical cross sectional views for explaining conditions of blade arrangement with respect to the photosensitive member.

Referring to FIG. 9, the disadvantage as mentioned above is eliminated by effecting the cleaning at the obtuse angle side of angles made between the blade 16 and the photosensitive member 1. In this case, one part of the resultant force R is stored as an elastic strain of blade and all the other part of the resultant force works as a cleaning force. The blade 16 is pushed to the wedge-like space between the holder 17 and the photosensitive member 1, that is, a direction of the frictional force F, [and thereby] *and forms an angle between the end surface of the blade and an uncleaned portion of the photosensitive member surface of not more than 90°, as shown in FIG. 9. Thereby,* the toner-obstructing force is far larger than that in FIG. 8 and entering of toner particles under the blade is almost completely obstructed.

Figure 10:
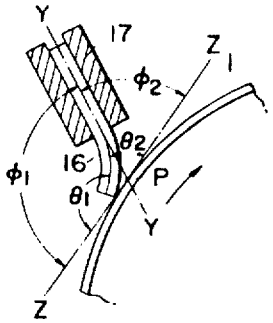

Referring to FIG. 10, assuming a tangent line Z—Z passing the intersecting point P of an extension line of the axis Y—Y of the holder 17 and the photosensitive member 1, among the angles subtended by line Z—Z and line Y—Y, the angle at the pre-cleaning side and the angle at the post-cleaning side are designated as $\phi_1$ and $\phi_2$, respectively. Among the angles subtended by the tangent line Z—Z and the axis line of the bending portion of the blade 16, the angle at the pre-cleaning side and the angle at the post-cleaning side are designated as $\theta_1$ and $\theta_2$, respectively. When these various angles are in the following relations:

$$\theta_1 > \phi_1$$

$$\theta_2 < \phi_2$$

$$\pi/2 \leqq \theta_1 \leqq \pi,$$

a good result is obtained. The relation $$\theta_1 \cong \tfrac{5}{6}\pi$$

is preferably used.

The optimum value of angle $\theta_1$ of blade 16 varies depending upon physical properties of material (e.g., hardness) and effective length (length of the blade outside of holder 17) of blade 16. In general, there are obtained good results at hardness of 30°-90°, thickness of 2-10 mm. and effective length of 10-40 mm. For example, $\theta_1 \cong 150°$ is optimum for silicone rubber having hardness of 80°, thickness of 7 mm and effective length of 30 mm. Upon selecting a blade with respect to the material, there are taken into consideration surface properties of the photosensitive member such as a coefficient of friction between the blade and the insulating layer at the surface of the photosensitive member, modulus of elasticity and the like, and peripheral velocity. In general, there are preferably used synthetic rubbers such as urethane rubber, nitrile rubber, neoprene rubber and silicone rubber, and natural rubber. In case of liquid development, urethane rubber, nitrile rubber and neoprene rubber are preferable. In the drawing attached hereto, there are shown only drum type photosensitive members 1, but it will be understood that the above matters referring to a cleaning blade may be similarly applied to a plate type photosensitive member.

Figure 13:
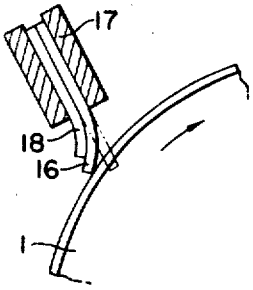
FIG. 13 shows a diagrammatical cross sectional view of a modified embodiment of a blade according to this invention.

Referring to FIG. 13, *the blade is formed in two layers 18 and 16, wherein* an arc-shaped supporting member 18 which is harder than the blade 16 is provided along the flexible blade 16 to strengthen the blade 16 simultaneously retaining a desirable softness at the edge portion contacting with the photosensitive member 1 and thereby the whole length of the photosensitive member 1 can contact uniformly with the photosensitive member 1. Further, it is also effective to use at the edge portion of the blade 16 an elastic material of high abrasion resistance, high solvent-proof and low coefficient of friction such as silicone rubber and Teflon and use at the other portions of the blade 16 an inexpensive [materials] *material* such as neoprene rubber and metallic elastic material.

Figure 11:
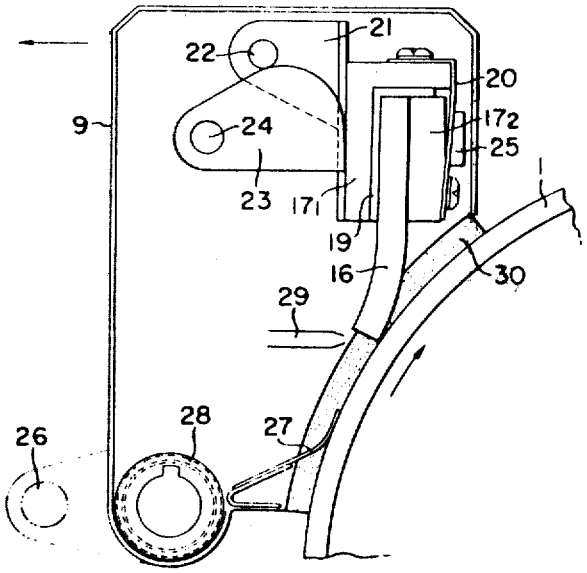
FIG. 11 shows a cross sectional side view of an embodiment of this invention.
Figure 12:
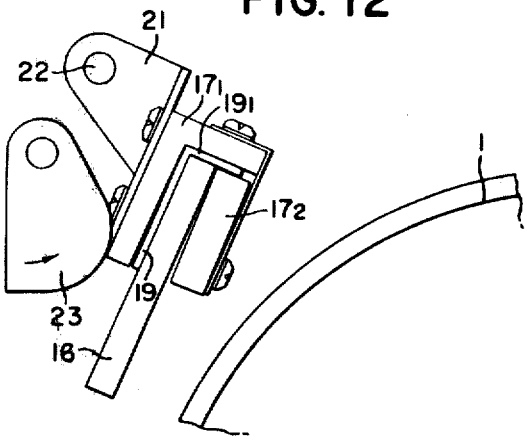
FIG. 12 shows a state of exchanging the blade.

Referring to FIG. 11 and FIG. 12, there is provided a cleaning cover 9 for preventing toners from scattering, and packings 30 are provided at both ends of the photosensitive drum corresponding to the opening of the cover 9 so as to seal as far as possible. At the upper part of the blade 16 there is provided a plate 19 and the blade is removably fitted to the holder in a cartridge system. Holder is composed of a main part $17_1$ and a movable part $17_2$ movably attached to the main part $17_1$, and the main part $17_1$ is rotatably fitted to the both side plates of the cover 9 with bracket 21 and shaft 22. Cam 23 is fitted to a cover 9 with a shaft 24, and a holder stopper is represented by 25.

When cam 23 is [loosed] *loosened* by a knob outside of cover 9, holder $17_1$, $17_2$ hangs down around shaft 22 to a direction leaving from photosensitive member 1 due to the own weight of holder as illustrated in FIG. 12. Since the distance between the main part $17_1$ and the movable part $17_2$ can open, to some extent, against a plate spring 20, blade 16 can be inserted between the main part $17_1$ and the movable part $17_2$. It is preferable to form a bending part $19_1$ at the upper part of the plate 19 and hang the bending part $19_1$ on the movable part $17_2$ so as to prevent the blade 16 from falling down and, further, this serves to set the position in a vertical direction. When cam 23 is fastened, holder $17_1$, $17_2$ is pushed by cam 23 and stopper 25 to hold tightly the blade 16. These various parts should be so designed as to satisfy the angle relations among blade, holder and photosensitive member as mentioned above. Cover 9 may be rotatably fitted to the housing of the copying machine with the shaft 26 for the purpose of facilitating the removing of blade 16.

Toners scratched off by the blade 16 are introduced to the bottom portion of the cover by way of a guide plate 27 and then transferred to a recovery box by a screw conveyor 28 followed by an appropriate treatment for reuse. It is not desirable that toners deposit around the edge of blade 16 contacting the photosensitive member 1 since such deposited toners cause reduction of cleaning ability and lowering of blade life due to abrasion of the blade. Therefore, air or a liquid may be ejected from a nozzle 29 to the edge portion to prevent such deposit. In place of ejection, vacuum suction also may be used. Such removing of deposited toner is far more important for a liquid developing system than for a dry developing system since a liquid developer usually contains a fixing agent and removing of the dried or half-dried toner is extremely difficult. Therefore, it is effective to weaken the adhesiveness of toners to the photosensitive member by ejecting a liquid such as Isopar (trade name, supplied by ESSO) and Freon (trade name, supplied by E. I. du Pont de Nemours & Co. Inc.) and to scratch off the deposited toners.

The cleaning apparatus according to this invention is very effective for cleaning a photosensitive member of electrophotographic apparatus. It is particularly useful for a photosensitive member having a surface insulating layer which is subjected to primary charging, imagewise exposure simultaneously with secondary charging of polarity opposite to that of the primary charging or AC corona discharging and, if desired, whole surface exposure.

The above-mentioned electrophotographic methods can produce electrostatic latent images having surface potential as high as several V to 2000 V on the insulating layer and the resulting latent image is developed with a toner to form a visual toner image, which is then transferred to a copying paper or web. Thereafter, toner remaining on the surface of the photosensitive member is taken away by a cleaning means. The photosensitive member having an insulating layer at the surface has an advantage that the photoconductive layer present under the insulating layer is not damaged by the cleaning member, but the very high surface potential on the insulating layer disadvantageously renders a complete cleaning of toner remaining surface very difficult. However, according to the cleaning apparatus of this invention, the complete cleaning is possible.

We claim:

1. A cleaning apparatus for an electrophotographic copying device wherein an electrophotographic latent image formed on the surface of a photosensitive member is moved past a series of processing stations including a developing station at which said latent image is developed with toner to form a toner image and a transfer station at which said toner image is transferred to copying material, comprising an elastic cleaning blade for removing residual toner from said photosensitive member after transfer of said toner image to said copying material, said residual toner being scratched off in the direction opposite to that of the movement of said photosensitive member, one end of said elastic cleaning blade having a cleaning edge, and holder means for supporting the opposite end of said elastic cleaning blade and disposing said cleaning edge in contact against the surface of said photosensitive member, said holder means disposing said elastic cleaning blade relative to said photosensitive member to engage a substantially upwardly moving surface portion of said photosensitive member, said elastic cleaning blade being placed above the horizontal axis of a rotary member carrying said surface, said holder means disposing said elastic cleaning blade relative to said photosensitive member at an angle $\theta_1$, at the pre-cleaning side, subtended by the axis of the end portion of the blade contacting the photosensitive member with said cleaning edge and a straight line touching the surface of the photosensitive member at the contact point, and at an angle [$\theta$]$\phi_1$, at the pre-cleaning side, subtending by the axis of a portion of the blade near said [opposide] *opposite* end which is supported by said holder means and said line, said angles $\theta_1$ and [$\theta$]$\phi_1$ satisfying the following relation:

$$\theta_1 > \phi_1 > \pi/2.$$

2. A cleaning apparatus for an electrophotographic copying device wherein an electrophotograhpic latent image formed on the surface of a photosensitive member is moved past a series of processing stations including a developing station at which said latent image is developed with a toner to form a toner image and a transfer station at which said toner image is transferred to copying material, comprising, in combination, an elastic cleaning blade for removing residual toner from said photosensitive member after transfer of said toner image to said copying material, one end of said elastic cleaning blade having a cleaning edge, and holding means for supporting the opposite end of said elastic cleaning blade and disposing said cleaning edge in contact against the surface of said photosensitive member to scratch off said residual toner in a direction opposite to that of the movement of said photosensitive member, said holder means disposing said elastic cleaning blade relative to said photosensitive member to engage a substantially upwardly moving surface portion of said photosensitive member.

3. A cleaning apparatus according to claim 2 in which there are a plurality of cleaning blades and holder means.

4. A cleaning apparatus according to claim 3 wherein said plurality of blades are placed above the horizontal axis of a rotary member carrying said surface and there is provided a sheet for guiding the toner scratched off said photosensitive member to a toner receiver, said toner being collected by gravitationally falling.

5. A cleaning apparatus according to claim 2 in which said cleaning blade has a toner scratching part and a toner receiving part.

6. A cleaning apparatus according to claim 2 further comprising an elastic cleaning roller coated with a cleaning member arranged after said cleaning blade and a toner collecting portion for collecting toners scratched off said photosensitive member.

7. A cleaning apparatus according to claim 2 in which said cleaning blade consists of a first layer and a second layer, the modulus of elasticity of said first layer being substantially greater than the modulus of elasticity of said second layer.

8. A cleaning apparatus according to claim 2 in which only the end portion of said cleaning blade having said cleaning edge is composed of an elastic member having high abrasion resistance and high solvent resistance.

9. A cleaning apparatus according to claim 2 in which said holder means is provided movably with respect to said photosensitive member and said cleaning blade is removably fitted to said holder means in a cartridge type [fit] *system.*

*10. A cleaning apparatus for an electrophotographic copying device wherein an electrophotographic latent image formed on the surface of a medium is moved past a series of processing stations including a developing station at which said latent image is developed with toner to form a toner image and a transfer station at which said toner image is transferred to copying material, said cleaning apparatus comprising an elastic cleaning blade for cleaning the surface of said medium for repeated use after transfer of said toner image to said copying material, said elastic blade having a cleaning edge, and cartridge system holder means for holding the other edge of said elastic cleaning blade and disposing the cleaning edge in contact with the surface of said medium to be cleaned, said cartridge holder means including a main support member for supporting one side of said cleaning blade and an opposed support member for supporting the other side of said cleaning blade, said main and opposed support members removably supporting said cleaning blade in said cartridge holder means.*

*11. A cleaning apparatus as in claim 10, wherein said cartridge holder means disposes said cleaning blade against said surface in counter-direction with respect to the direction of movement of said surface.*

*12. A cleaning apparatus as in claim 10 wherein said cleaning blade includes a support plate adjacent said other edge.*

*13. A cleaning apparatus for an electrophotographic copying device wherein an electrophotographic latent image formed on the surface of a medium is moved past a series of processing stations including a developing station at which said latent image is developed with toner to form a toner image and a transfer station at which said toner image is transferred to copying material, said cleaning apparatus comprising an elastic cleaning blade for cleaning the surface of said medium for repeated use after transfer of said toner image to said copying material, said elastic*

*blade having a cleaning edge, and cartridge system holder means for holding the other edge of said elastic cleaning blade and disposing the cleaning edge in contact with the surface of said medium to be cleaned, said cartridge holder means including a main support member for supporting one side of said cleaning blade and an opposed support member for supporting the other side of said cleaning blade, said main and opposed support members removably supporting said cleaning blade in said cartridge holder means and means for rotatably mounting said cartridge holder means relative to said surface of said medium for movement of said cleaning blade away from the surface of said medium.*

*14. A cleaning apparatus as in claim 13, wherein said cartridge holder means disposes said cleaning blade against said surface in counter-direction with respect to the direction of movement of said surface.*

*15. A cleaning apparatus as in claim 13, wherein said cleaning blade includes a support plate adjacent said other edge.*

*16. A cleaning apparatus for an electrophotographic copying device wherein an electrophotographic latent image formed on the surface of a medium is moved past a series of processing stations including a developing station at which said latent image is developed with toner to form a toner image and a transfer station at which said toner image is transferred to copying material, said cleaning apparatus comprising an elastic cleaning blade for cleaning the surface of said medium for repeated use after transfer of said toner image to said copying material, said elastic blade having a cleaning edge, and cartridge system holder means for holding the other edge of said elastic cleaning blade and disposing the cleaning edge in contact with the surface of said medium to be cleaned, said cartridge holder means including a main support member for supporting one side of said cleaning blade and an opposed support member for supporting the other side of said cleaning blade, said main and opposed support members removably supporting said cleaning blade in said cartridge holder means and means for supplying a fluid to the area where the cleaning edge of said cleaning blade is in contact with said surface of said medium whereby deposit of toner during cleaning operation is prevented.*

*17. A cleaning apparatus as in claim 16, wherein said cartridge holder means disposes said cleaning blade against said surface in counter-direction with respect to the direction of movement of said surface.*

*18. A cleaning apparatus as in claim 16, wherein said cleaning blade includes a support plate adjacent said other edge.*

*19. A cleaning apparatus as in claim 16, wherein said fluid is a liquid.*

*20. A cleaning apparatus for electrophotographic copying device wherein an electrophotographic latent image formed on the surface of a photosensitive medium is moved past a series of processing stations including a developing station at which said latent image is developed with toner to form a toner image and a transfer station at which said toner image is transferred to copying material, comprising an elastic cleaning blade for cleaning the surface of said photosensitive medium for repeated use after transfer of said toner image to said copying material, said elastic blade having a cleaning edge, and cartridge system holder means for supporting the other edge of said elastic cleaning blade and disposing the cleaning edge in contact against the surface of said photosensitive medium to be cleaned after transfer of said toner image, said cartridge holder means having a main support member for supporting one side of said cleaning blade and an opposed support member for supporting the other side of said cleaning blade, said main and opposed support members removably supporting said cleaning blade in said cartridge holder means, means for rotating said cartridge holder means for movement relative to said surface medium to permit movement of said cleaning blade away from said medium and means for ejecting fluid adjacent the area where the edge of cleaning blade is in cleaning position to prevent deposit of toner during cleaning operation.*

*21. A cleaning apparatus as in claim 17, wherein said cartridge holder means disposes said cleaning blade against said surface in a counter-direction with respect to the direction of movement of said surface.*

*22. A cleaning apparatus as in claim 20, wherein said cleaning blade includes a support plate adjacent said other edge.*

*23. A cleaning apparatus for an electrophotographic copying device wherein an electrophotographic latent image formed on the surface of a medium is moved past a series of processing stations including a developing station at which said latent image is developed with toner to form a toner image and a transfer station at which said toner image is transferred to copying material, said cleaning apparatus comprising an elastic cleaning blade for cleaning the surface of said medium for repeated use after transfer of said toner image to said copying material, said elastic blade having a cleaning edge, and cartridge system holder means for holding the other edge of said elastic cleaning blade and disposing the cleaning edge in contact with the surface of said medium to be cleaned, said cartridge holder means including a main support member for supporting one side of said cleaning blade and an opposed support member movable relative to said main support member for supporting the other side of said cleaning blade, said opposed support member being resiliently urged against said other side of said cleaning blade to removably support said cleaning blade in said cartridge holder means.*

*24. A cleaning apparatus as in claim 23, wherein said opposed support member includes a relatively thin plate spring.*

*25. A cleaning apparatus as in claim 23, wherein said cleaning blade includes a support plate adjacent said other edge.*

*26. A cleaning apparatus for an electrophotographic copying device wherein an electrophotographic latent image formed on the surface of a photosensitive member is moved past a series of processing stations including a developing station at which said latent image is developed with a toner to form a toner image and a transfer station at which said toner image is transferred to copying material, comprising, in combination, an elastic cleaning blade for removing residual toner from said photosensitive member after transfer of said toner image to said copying material, one end of said elastic cleaning blade having a cleaning edge, holding means for supporting the opposite end of said elastic cleaning blade and disposing said cleaning edge in contact against the surface of said photosensitive member to remove said residual toner, said holder means disposing said elastic cleaning blade relative to said photosensitive member to engage a substantially upwardly moving surface portion of said photosensitive member, and a sheet having one edge disposed to allow the residual toner to pass between the photosensitive member surface and said sheet, below said engagement between said blade and photosensitive member, said sheet being positioned to receive the toner removed by said cleaning blade for guiding the removed toner to a toner receiver.*

*27. A cleaning apparatus for an electrophotographic copying device wherein an electrophotographic latent image formed on a surface of a photosensitive member is moved past a series of processing stations including a developing station at which said latent image is developed with a toner to form a toner image and a transfer station at which said toner image is transferred to copying material, comprising, in combination: an elastic cleaning blade for scratching off said residual toner in a direction opposite to that of the movement of said photosensitive member, after transfer of said toner image to said copying material, said blade having two abutting layers; holding means for supporting first ends of said abutting two layers, wherein the opposite ends of said layers project outside of said holding means toward said photosensitive member, and wherein one of said layers has a cleaning edge disposed in contact with the surface of said photosensitive member to remove said residual toner, said holding means disposing said one layer to engage a substantially upwardly moving surface portion of said photosensitive member, wherein the other layer of said blade has a higher modulus of elasticity than that of said one layer and is provided on the upstream side of said one layer.*

* * * * *

UNITED STATES PATENT AND TRADEMARK OFFICE

CERTIFICATE OF CORRECTION

PATENT NO. : Re. 30,924

DATED : May 11, 1982

INVENTOR(S) : HAJIME KATAYAMA, ET AL.

It is certified that error appears in the above—identified patent and that said Letters Patent is hereby corrected as shown below:

IN CLAIMS 1 AND 2

COLUMN 7

Lines 22 and 59, respectively, after "edge" insert --formed at an end surface of the blade which faces an uncleaned portion of said photosensitive member surface wherein the angle formed between said end surface and the uncleaned photosensitive member surface is not more than 90°--.

IN CLAIM 4

COLUMN 8

Line 7, after "sheet" insert --disposed beneath at least one of said plurality of cleaning blades--.

UNITED STATES PATENT AND TRADEMARK OFFICE

CERTIFICATE OF CORRECTION

PATENT NO. : Re. 30,924

DATED : May 11, 1982

INVENTOR(S) : HAJIME KATAYAMA, ET AL.

It is certified that error appears in the above—identified patent and that said Letters Patent is hereby corrected as shown below:

IN CLAIM 4 (Continued)

COLUMN 8

Line 8, after "member" insert --, by said at least one cleaning blade,--.

IN CLAIM 5

COLUMN 8

Line 10, change "Claim 2" to read --Claim 3--.

Line 11, change "said cleaning blade" to read --at least one of said plurality of cleaning blades--.

IN CLAIM 6

COLUMN 8

Line 14, change "coated with a cleaning member" to read --having a cleaning coating thereon and being--.

UNITED STATES PATENT AND TRADEMARK OFFICE

CERTIFICATE OF CORRECTION

PATENT NO. : Re. 30,924

DATED : May 11, 1982

INVENTOR(S) : HAJIME KATAYAMA, ET AL.

It is certified that error appears in the above—identified patent and that said Letters Patent is hereby corrected as shown below:

IN CLAIM 6 (Continued)

COLUMN 8

Line 15, after "blade" insert --,--.

Line 16, change "portion" to read --receiver--.

IN CLAIM 13

COLUMN 9

Line 10, after "means" (first occurrence) insert --,--.

Signed and Sealed this

*Twenty-first* Day of *September 1982*

[SEAL]

*Attest:*

GERALD J. MOSSINGHOFF

*Attesting Officer* *Commissioner of Patents and Trademarks*